United States Patent [19]

Fiondella

[11] Patent Number: 5,337,787
[45] Date of Patent: Aug. 16, 1994

[54] CIRCUMFERENTIAL SEALING APPARATUS

[75] Inventor: Stephen J. Fiondella, New Haven, Conn.

[73] Assignee: Honeywell Inc., Minneapolis, Minn.

[21] Appl. No.: 77,474

[22] Filed: Jun. 15, 1993

[51] Int. Cl.$^5$ .................. F15B 13/043; F16K 11/07
[52] U.S. Cl. .................. 137/625.69; 137/625.66; 251/367; 251/900
[58] Field of Search .................. 137/625.66, 625.69; 251/367, 900

[56] References Cited

U.S. PATENT DOCUMENTS

| | | | |
|---|---|---|---|
| 3,199,540 | 8/1965 | Forster | 137/625.69 |
| 3,968,971 | 7/1976 | Mariaulle | 137/625.69 X |
| 4,491,155 | 1/1985 | Meyer et al. | 137/625.69 X |
| 4,630,800 | 12/1986 | Brausfeld et al. | 137/625.69 X |
| 5,273,074 | 12/1993 | Conradt et al. | 137/625.66 X |

FOREIGN PATENT DOCUMENTS 616203  3/1961  Canada .................. 137/625.69

*Primary Examiner*—Gerald A. Michalsky
*Attorney, Agent, or Firm*—William D. Lanyi

[57] ABSTRACT

A cylindrical seal arrangement is provided by alternatively disposing a plurality of O-ring seals and cages in a generally cylindrical arrangement. The O-ring seals are generally annular in shape and, in cross section, comprise an inner portion, an outer portion and an connector portion. The three portions of the O-ring seal cross section define annular grooves in the axial surfaces of the seals. Cages are disposed in alternating positions with the seals and each cage is provided with an annular protrusion extending from its axial faces. The protrusions are shaped to be received in the annular grooves of the seals and the O-ring seals and cages are sized to prevent compression of the inner portion of the seal in an axial direction when an axial force is exerted on the cage and seal assembly.

9 Claims, 6 Drawing Sheets

CIRCUMFERENTIAL SEALING APPARATUS

BACKGROUND OF THE INVENTION

1. Field of the Invention

The present invention relates generally to a circumferential sealing apparatus and, more specifically, to a spool valve sealing cage which comprises a plurality of O-ring seals and generally rigid cages aligned axially with a common central axis.

2. Description of the Prior Art

It is well known to those skilled in the art to incorporate a plurality of O-ring seals and generally rigid cages, in alternating association with each other, to define a generally cylindrical apparatus in which a spool is disposed for axial movement. The O-ring seals prevent fluid from passing from one region to another along the length of the cylindrical association of cages and seals. The cylindrical assembly of cages and seals is disposed about a central axis and a generally cylindrical spool member is slidably arranged within the cylindrical assembly and in coaxial and concentric association with the cylindrical assembly of cages and seals.

Since a plurality of cages and seals are required to construct the cylindrical sealing apparatus, the tolerance stackup of the assembly can adversely affect its length. Since the assembly is disposed between two stationary locations within the valve body which define the limit of its axial length, variations in the individual axial dimensions of the cages and seals can affect the axial forces exerted by the cages on the seals, which are generally made of an elastomeric material. These forces can result in axial compression of the O-ring seals. The axial compression can seriously affect the radial dimensions of both the inside and outside diameters of the O-ring seals.

It would therefore be significantly beneficial if a sealing apparatus can be provided which avoids the disadvantageous radial effects caused by the tolerance stackup of axial dimensions.

SUMMARY OF THE INVENTION

A preferred embodiment of the present invention provides a stationary sealing device that comprises a plurality of generally rigid cages and a plurality of compressible seals disposed in alternating axial positions. Each of the seals is generally annular in shape with an inside diameter and an outside diameter. Each of the seals has a cross section which comprises a radially outer portion, a radially inner portion and a connector portion disposed radially between and attached to the radially inner and outer portions. The inner portion of the seal is generally semicircular in cross section. The inner and outer portions of the seal, in cooperation with the connector portion of the seal, are shaped to define a first annular groove formed in a first axial surface of each of the plurality of seals in the sealing device. A second annular groove is formed in a second axial surface of each seal. Each of the annular grooves within the axial surfaces of the seals are shaped to receive an annular protrusion which extends axially from each of the plurality of cages. The connector portion of each seal and the annular protrusion of each cage are sized to provide axial clearance between the inner portion of the seal and an axial face of each of the adjacent cages located radially inward from the annular protrusion. In a most preferred embodiment of the present invention, the cages are made of metal or plastic and the seals are made of an elastomeric material, such as nitrile. The outer portion of the seal is generally semicircular in cross section in a most preferred embodiment of the present invention. The plurality of cages and plurality of seals are disposed together in a cylindrical association which is disposed within a valve body and a spool member is disposed within the sealing device with an outer cylindrical surface of the spool member being disposed in sliding contact with the inside diameter of each of the plurality of seals.

BRIEF DESCRIPTION OF THE DRAWINGS

The present invention will be more fully understood from a reading of the Description of the Preferred Embodiment in conjunction with the drawings, in which.

DESCRIPTION OF THE PREFERRED EMBODIMENT

Figure 1:
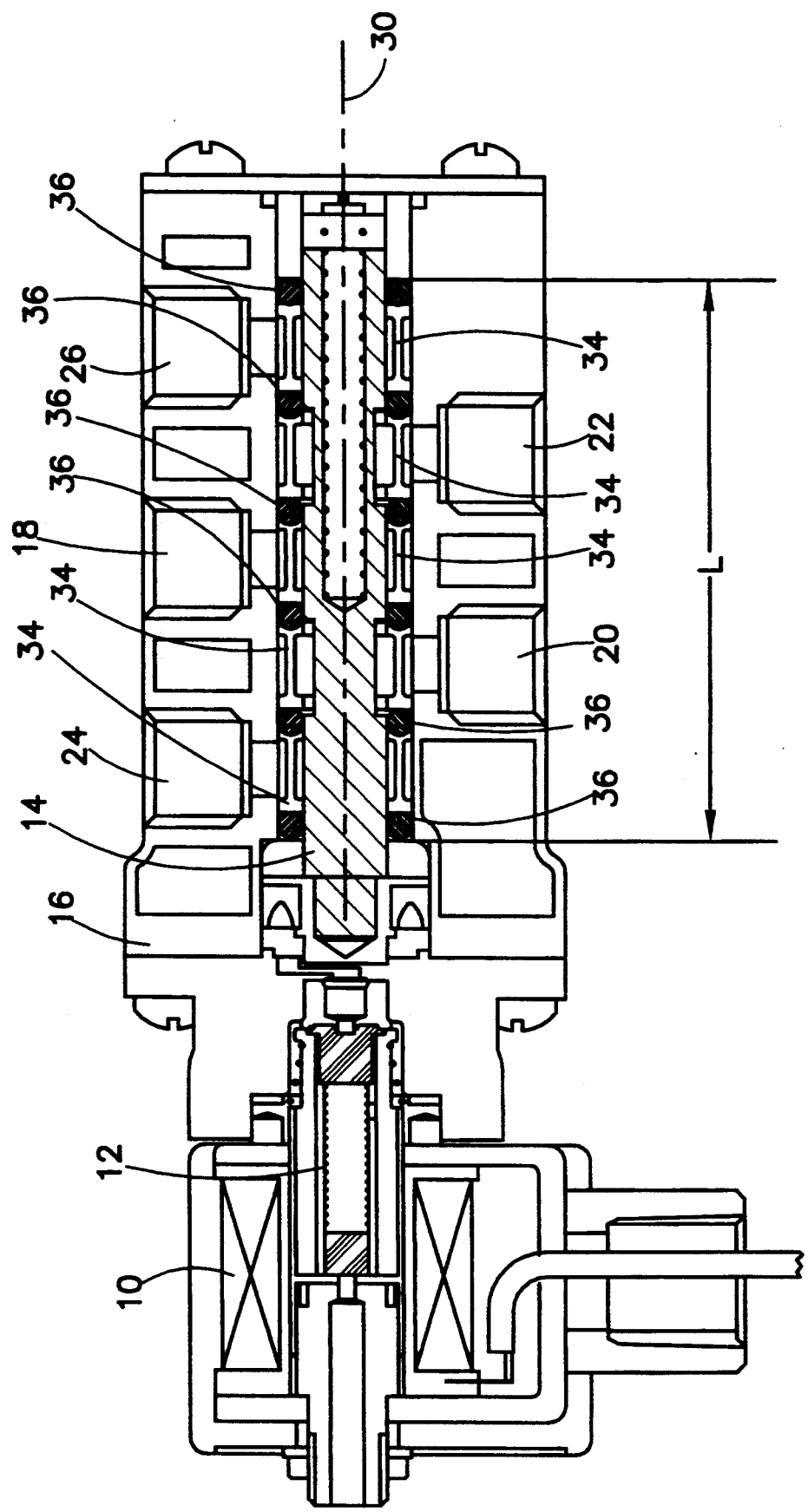
FIG. 1 illustrates a cross sectional representation of a spool valve and pilot valve assembly generally known to those skilled in the art.

Throughout of the Description of the Preferred Embodiment, like components will be identified with like reference numerals.

FIG. 1 illustrates a valve of the type which is well known to those skilled in the art. A pilot valve comprises a solenoid coil 10 and a plunger 12 which is axially moveable to block or open a passage that controls the operating pressure of a spool valve. The spool valve comprises a spool member 14 disposed within a valve body 16. Although many different fluid passage arrangements are possible, a typical arrangement would provide a pressure port 18, two outlet ports, 20 and 22 and two exhaust ports, 24 and 26. The spool member 14 is provided with a plurality of depressions formed in its outer cylindrical surface so that axial movement of the spool member 14 along an axis 30 selectively provides fluid communication between the pressure port 18 and a preselected one of the two outlet ports, 20 and 22. It should be understood that the precise operation and specific locations of the spool and ports is not a limiting characteristic of the present invention.

In order to provide proper fluid sealing between the ports in the valve body 16, a plurality of cages and O-ring seals are associated together in alternating positions to define a generally cylindrical sealing device. For example, FIG. 1 illustrates the cages 34 and O-ring seals 36 alternately arranged along the central axis 30 to define a cylindrical apparatus that provides seals between the ports in the valve body 16. With continued reference to FIG. 1, it can be seen that the six O-ring seals 36 and five cages 34 are arranged between two stationary components which define a distance L therebetween. Therefore, the combined axial thickness of the six O-rings and five cages must be equal to dimension L within a preselected tolerance range. If the tolerance stackup of all the individual components exceeds dimension L, the fixed stationary locations of the two devices which define dimension L will cause a compressive force to be exerted on all of the cages and O-rings. This compressive force will reduce the axial dimensions of the six O-rings. Since each O-ring comprises a fixed volume of elastomeric material, the axial compression necessitates that the radial dimensions change to accommodate it. The change in radial dimension caused by the axial compression of the O-rings results in a reduction in the inside diameters of each O-ring.

Figure 2:
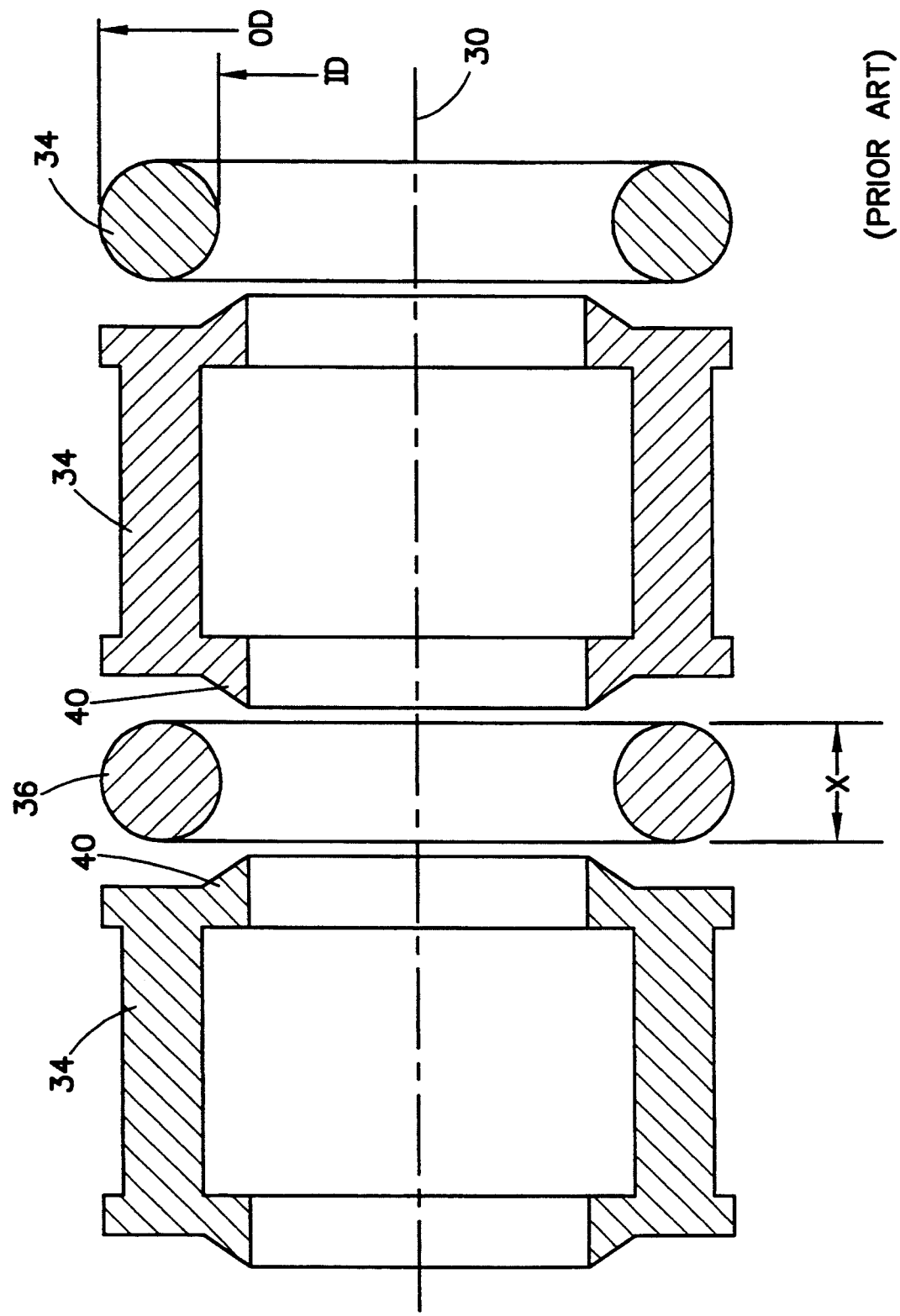
FIG. 2 illustrates an exploded view of cages and O-ring seals that are known to those skilled in the art.

FIG. 2 provides a more detailed illustration of the cages 34 and O-ring seals 36 shown in FIG. 1. For purposes of this discussion, two cages 34 and two O-ring seals 36 are illustrated in FIG. 2 arranged in alternating axial positions along central axis 30. The cages and O-ring seals in FIG. 2 are shown in an exploded view in which the seals and cages are not in contact with each other. However, it should be understood that in actual implementation, the cages 34 and O-ring seals 36 are disposed in contact with each other and an axial compressive force is exerted on them.

With continued reference to FIG. 2, it can be seen that the O-ring seals 36 are generally annular in shape and comprise a generally circular cross section. Each O-ring seal 36 has an inside diameter ID and an outside diameter OD as shown in FIG. 2. The cages 34 can be provided with an axial extension portion 40 attached to the radially inward surface of the cages. This extension portion 40 serves to align the cages and O-ring seals along a generally cylindrical arrangement about central axis 30. During assembly of the valve structure, as shown in FIG. 1, the O-ring seals and cages are alternatively placed into a generally cylindrical bore which extends within the structure of the valve body 16. As the O-ring seals and cages are disposed within the bore, the axial extensions 40 assist in the alignment of each individual component at its proper position relative to the central axis 30.

Figure 3:
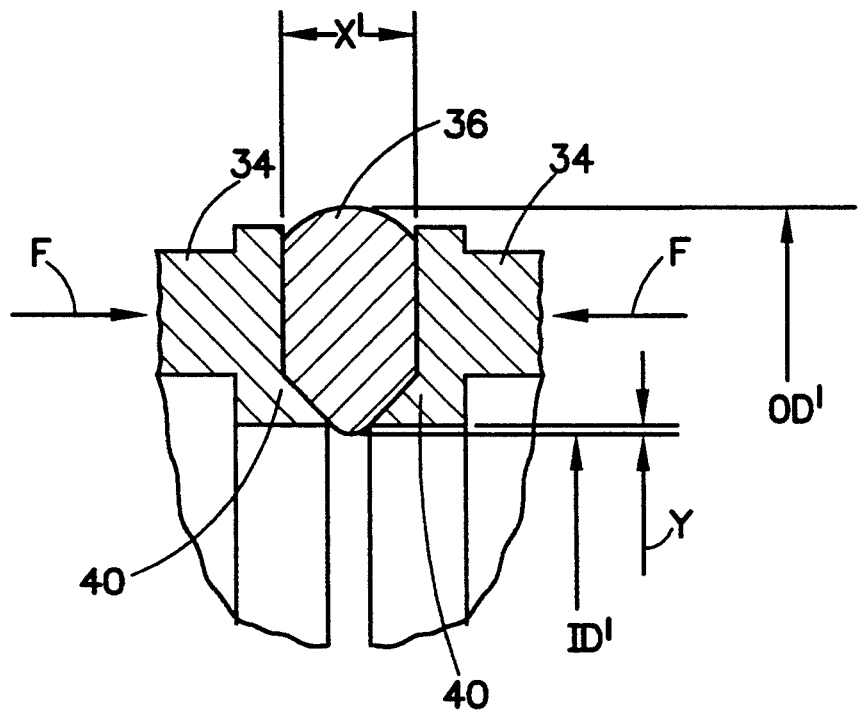
FIG. 3 illustrates the effect on an O-ring seal by compressive axial forces on associated cages.

As discussed above, the cages 34 and O-ring seals 36 shown in FIG. 1 are subjected to an axial force when the combined axial length of the plurality of O-ring seals and cages exceeds dimension L. This compressive force is exerted on the O-ring seals results in their deformation as shown in FIG. 3. FIG. 3 is a partial view of two cages 34 and an O-ring seal 36 disposed therebetween and placed under a compressive axial force F resulting from dimension L in FIG. 1 being less than the combined axial length of the six O-ring seals and five cages. When the axial force F is exerted on the O-ring seal 36, it axial dimension changes from X as shown in FIG. 2 to X′ as shown in FIG. 3, where X′ is less than X. Since each O-ring seal 36 comprises a fixed amount of elastomeric material, the compression in the axial direction must be accompanied by an expansion in the radial directions. As a result, the outside diameter OD′ shown in FIG. 3 is greater than the outside diameter OD in FIG. 2 and, likewise, the inside diameter ID′ in FIG. 3 is less than the inside diameter ID in FIG. 2. In most applications of spool valves, the change in the outside diameter is not significantly disadvantageous. However, the change in inside diameter, as represented by FIGS. 2 and 3, can be extremely deleterious. The inside diameter ID′ shown in FIG. 3 will vary as a function of the difference between dimension L and the total axial uncompressed length of the cage and O-ring seal assembly. This means that the dimension Y by which the inside diameter ID′ of the O-ring seal 36 extends radially inward beyond the inside diameter of the cage is not readily predictable, but will vary as a function of the differences in lengths between dimension L and the axial length of the O-ring seal and cage configuration.

The sealing or contact force exerted on the spool member 14 by the inside diameters of the plurality of O-ring seals 36 will vary as a function of the magnitude of their inside diameters. If compressive force F is less than expected because of a tolerance stackup in the negative direction, the contact force between the O-ring seals and the outer cylindrical surface of the spool member 14 may be less than that which is required to provide adequate sealing between the fluid ports of the valve body 16. On the other hand, if compressive force F is greater than expected because of a positive stackup of axial tolerances of the cages and O-ring seals, inside diameter ID′ will be less than expected and the contact force between the inside diameter of the O-ring seals and the outer cylindrical surface of the spool member 14 will be greater than desired. This greater contact force will increase the friction between the O-ring seals and the spool member and possibly result in an adverse effect on the operation of the valve. The present invention is directed toward avoiding the variability in the magnitude of the inside diameter of the O-ring seals regardless of the axial tolerance stackup of the cages and seals.

Figure 4:
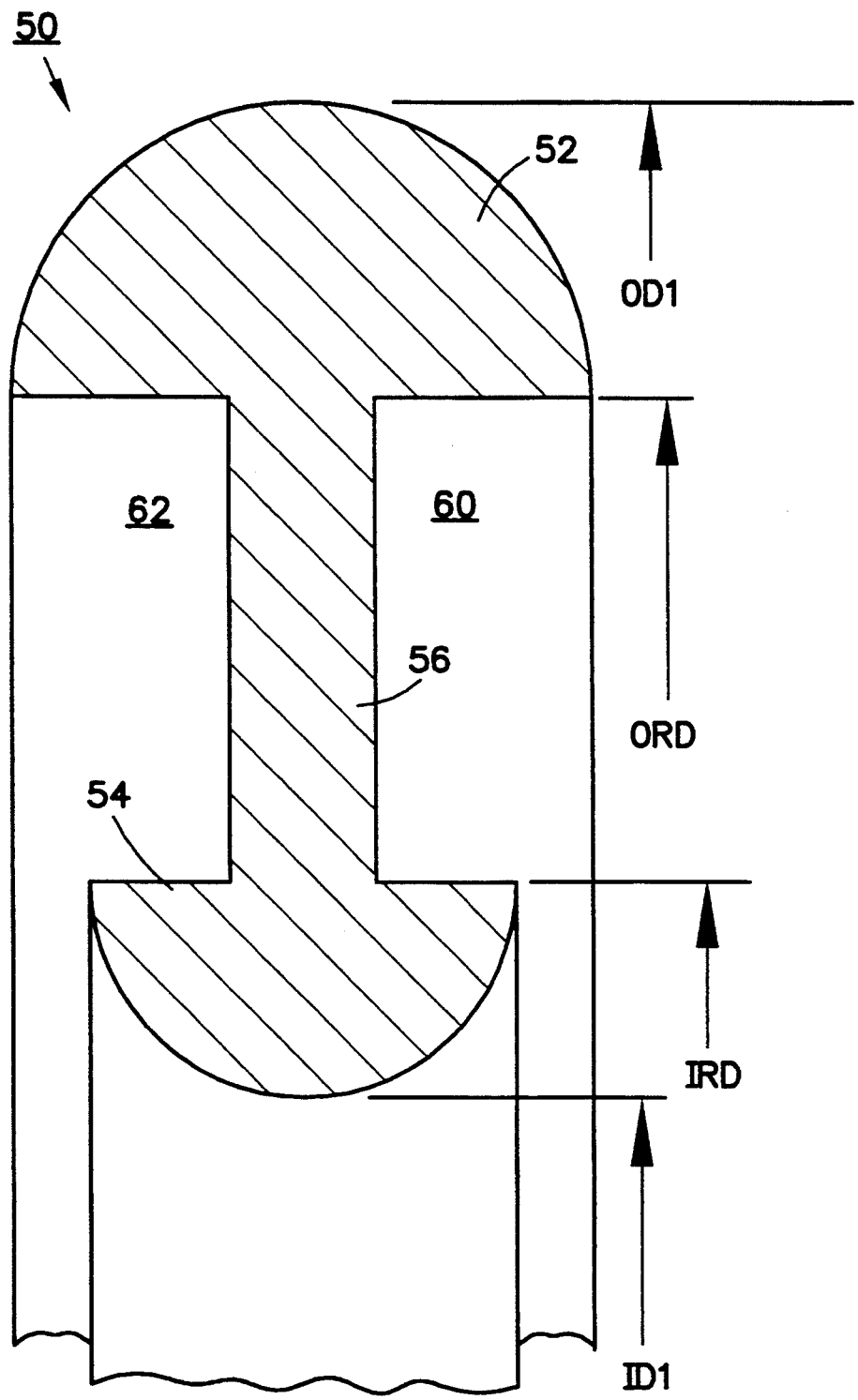
FIG. 4 illustrates a cross sectional view of an O-ring seal made in accordance with the present invention.

FIG. 4 illustrates a preferred embodiment of an O-ring seal 50 made in accordance with the present invention. The O-ring seal 50 comprises a radially outer portion 52, a radially inner portion 54 and a connector portion 56 which is disposed radially between the inner and outer portions and connected to both the inner and outer portions. The O-ring seal 50 made in accordance with the present invention is generally annular in shape and has a cross section as shown in FIG. 4 with the inner portion 54 being generally semicircular in shape. The outer portion 52 shown in FIG. 4 is also generally semicircular in shape, but it should be understood that this particular shape is not necessary in all embodiments of the present invention. For purposes of describing the shape of the O-ring seal 50, the outside diameter OD1 and the inside diameter ID1 are identified. In addition, the outer radial dimension ORD of the connector portion 56 and the inner radial dimension IRD of the connector portion 56 are both illustrated. Between the inner radial dimension and outer radial dimension, annular grooves 60 and 62 are defined by the positions and sizes of the inner portion 54, the outer portion 52 and the connector portion 56. These annular grooves are formed in the axial faces of the O-ring seal 50.

Figure 5:
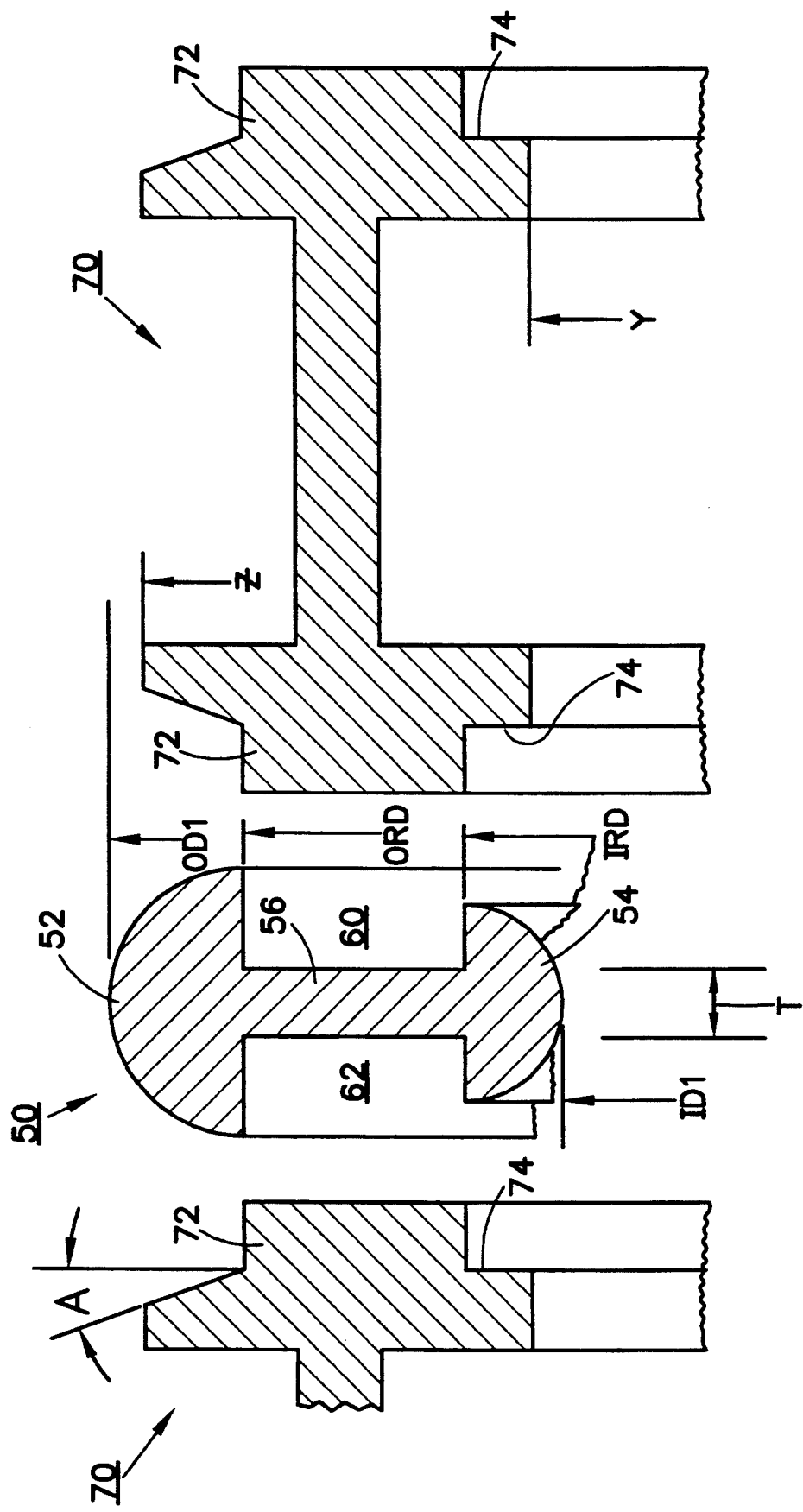
FIG. 5 illustrates an exploded view of an O-ring seal and cages made in accordance with the present invention.

FIG. 5 shows an O-ring seal 50 made in accordance with the present invention and associated with cages 70 that are particularly shaped for use with the O-ring seals 50. The overall shape of the cages 70 is generally similar to the cages 34 described above in conjunction with FIG. 2. However, each of the cages 70 is provided with an annular protrusion 72 which extends from an axial face 74 of the cage. The annular protrusion 72 is shaped to be received in one of the annular grooves, 60 or 62, of the O-ring seal 50. In a preferred embodiment of the present invention, the axial face of the cages which is disposed radially outward from the annular protrusions 72 is generally sloped, as shown in FIG. 5, at an angle A from the plane of the axial face 74. However, it should be understood that alternative embodiments of the present invention could incorporate axial faces that are not sloped. The reason for this sloping configuration in the preferred embodiment of the present invention will be described below. As can be seen, the illustration in FIG. 5 is an exploded view in which the O-ring seal 50 is not disposed in contact with either of the two cages 70.

Figure 6:
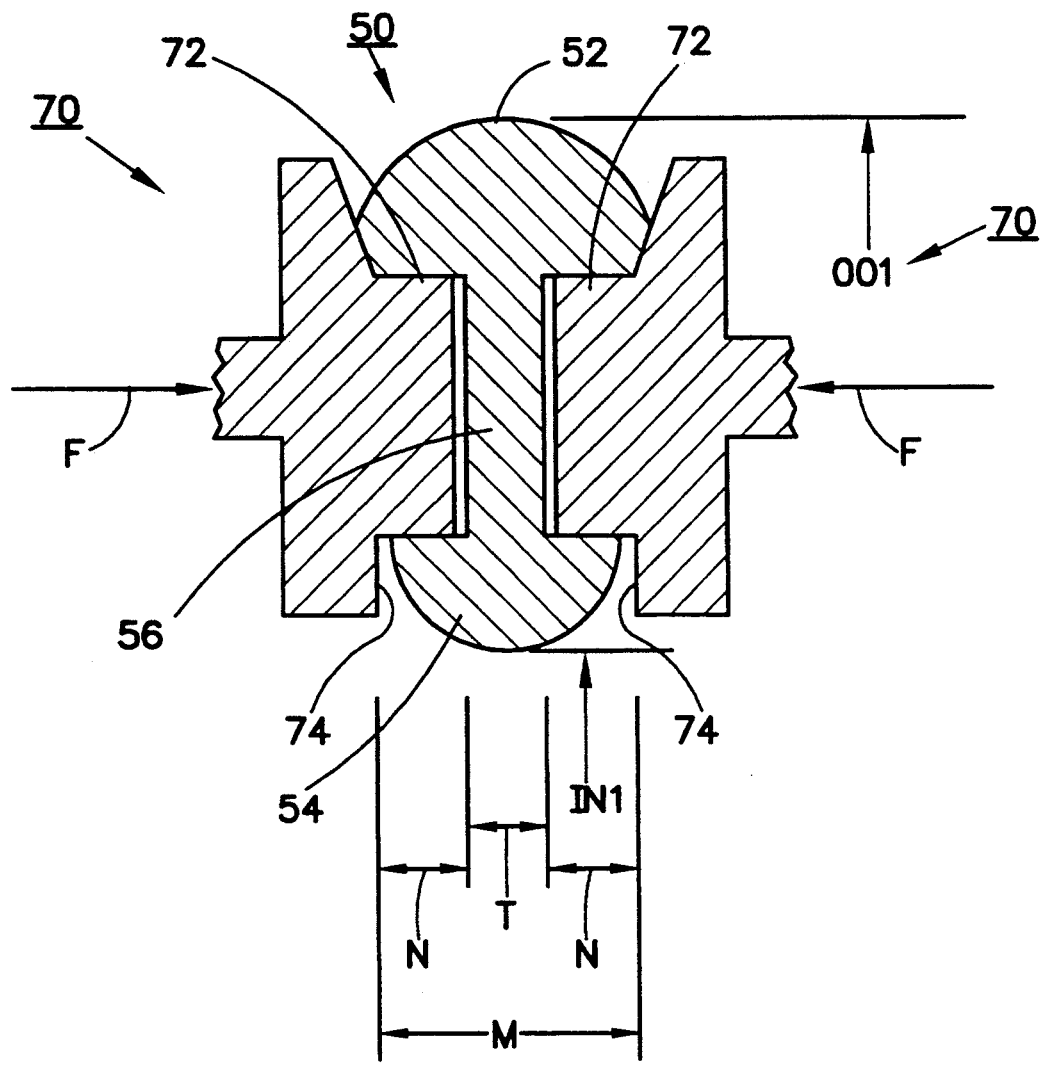
FIG. 6 illustrates the beneficial operation of the present invention when the O-ring seal is axially compressed by the movement of associated cages.

FIG. 6 illustrates an O-ring seal 50 associated in contact with two cages 70. FIG. 6 illustrates the effect of an axial force F on the assembly of cages and seals. As can be seen in FIG. 6, the axial force F causes an axial compression of the outer portion 52 and, to a lesser degree, the connector portion 56. However, the inner portion 54 is unaffected dimensionally by the existence of the compressive forces F. Since the inner portion 54 is not compressed axially, there will be virtually no effect on its radial dimension ID1. Therefore, the inside diameter ID1 will remain the same for the O-ring seal 50 in the uncompressed and compressed states which are illustrated in FIGS. 5 and 6, respectively. In addition, the difference between dimensions Y and ID1 will be essentially the same in both the compressed and uncompressed states. To further describe the particular configuration of the O-ring seal 50 shown in FIG. 6, dimension T represents the nominal axial thickness of the connector portion 56. Dimension N represents the axial extension of the annular portion 72 from the axial face 74 of the cages 70. Dimension M in FIG. 6 represents the distance between the axial faces 74 when the outer portion 52 is compressed by the two annular protrusions 72. As shown in FIG. 6, an axial clearance is provided between the two axial surfaces of the inner portion 54 and the axial faces 74 of the cages 70. This axial clearance permits compression of the outer portion 52 without a corresponding axial compression of the inner portion 54. As a result, the inside diameter ID1 of the O-ring seal 50 remains generally constant over a wide range of axial forces F and corresponding axial compressions. This permits the proper contact force to be maintained between the inside diameter ID1 of the O-ring seals 50 and the outer cylindrical surface of the spool member within a valve body even though the tolerance stackup may vary significantly in the axial direction.

Although the present invention has been described with particular specificity and illustrated to describe a preferred embodiment of the present invention with considerable detail, it should be understood that alternative embodiments of the present invention are within its scope. For example, the outer portion of the O-ring seal need not have a circular cross section. In fact, the particular cross sectional shapes of the inner portion, outer portion and connector portion can be different than those illustrated and described above as long as the relative cooperation of the annular grooves and the annular protrusions of the seals and cages, respectively, cooperate to prevent the axial compression of the inner portion of the seal.

The embodiments of the invention in which an exclusive property or right is claimed are defined as follows:

1. A stationary sealing device, comprising:
   a plurality of generally rigid cages; and
   a plurality of compressible seals disposed in alternating axial positions with said cages, each of said plurality seals being generally annular with an inside diameter and an outside diameter, each of said plurality of seals having a cross section which comprises a radially outer portion, a radially inner portion and a connector portion disposed radially between and attached to said radially inner and outer portions, said inner portion being generally semicircular, said outer portion being generally semicircular in cross section, said inner and outer portions and said connector portion being shaped to define a first annular groove in a first axial surface of each of said plurality of seals and a second annular groove in a second axial surface of each of said plurality of seals, each of said first and second grooves being shaped to receive an annular protrusion extending axially from each of said plurality of cages, said annular protrusion being disposed between a radially outer axial face and a radially inner face of said plurality of cages, said connector portion and said annular protrusion being sized to provide axial clearance between said radially inner portion and said radially inner axial face of each of said cages radially inward from said annular protrusion, said radially outer portion and said radially outer axial face of each of said plurality of cages being sized to compress said radially outer portion between said radially outer axial faces of adjacent ones of said plurality of cages.

2. The sealing device of claim 1, wherein:
   each of said plurality of cages is made of metal.

3. The sealing device of claim 1, wherein:
   each of said plurality of seals is made of an elastomeric material.

4. The sealing device of claim 1, wherein:
   said pluralities of cages and seals are disposed within a valve body.

5. The sealing device of claim 4, further comprising:
   a spool member disposed within said sealing device, an outer cylindrical surface of said spool member being disposed in contact with said inside diameter of each of said plurality of seals.

6. A sealing device, comprising:
   a plurality of an annular seals, each of said plurality of seals having an inside diameter and an outside diameter, each of said plurality of seals comprising a radially inner portion, a radially outer portion and a connector portion, said connector portion being disposed radially between said inner and outer portions and being attached to said inner and outer portions, said connector portion, said inner portion and said outer portion being shaped to form first and second annual grooves in first and second axial surfaces of each of said plurality of seals, said inner portion being generally semicircular in cross section; and
   a plurality of generally rigid cages, each of said plurality of cages having an annular protrusion extending from each of two axial faces thereof between a radially inner portion of said axial face and a radially outer portion of each of said axial faces, each of said first and second annular grooves being shaped to receive one of said annular protrusions therein, each of said annular grooves and each of said annular protrusions being sized to provide clearance between said radially inner portion of said axial face of each of said plurality of cages and said inner portion when said annular protrusion is disposed within said annular groove, said radially outer portion being sized to be compressed between said radially outer portion of said axial face of adjacent cages, said plurality of said seals and said plurality of said cages being alternatively arranged in a generally cylindrical configuration.

7. The sealing device of claim 6, wherein:

said annular seal is made of an elastomeric material.
8. The sealing device of claim 6, further comprising:
a generally cylindrical spool member disposed within said generally cylindrical configuration and in contact with said inside diameter of each of said plurality of seals.
9. The sealing device of claim 8, wherein:
said sealing device is disposed within a valve.